R. L. BENEDICT.
Corn-Drill.
No. 225,095. Patented Mar. 2, 1880.
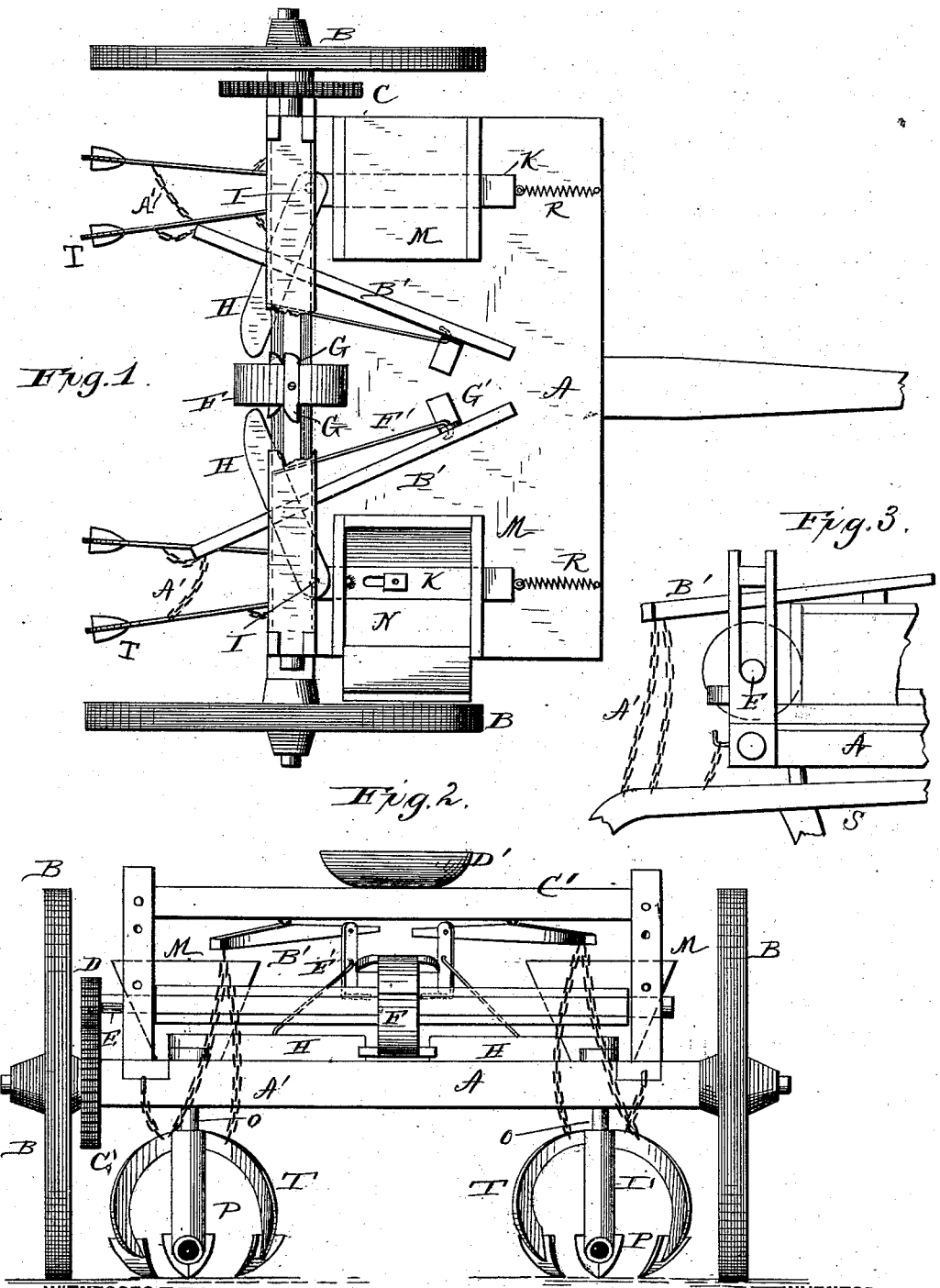
WITNESSES
F. L. Durand
E. H. Bradford
INVENTOR
R. L. Benedict
By H. F. Ennis
ATTORNEY

UNITED STATES PATENT OFFICE.

ROBERT L. BENEDICT, OF BORDLEY, KENTUCKY.

CORN-DRILL.

SPECIFICATION forming part of Letters Patent No. 225,095, dated March 2, 1880.

Application filed December 30, 1879.

*To all whom it may concern:*

Be it known that I, ROBERT L. BENEDICT, of Bordley, in the county of Union and State of Kentucky, have invented certain new and useful Improvements in Corn-Drills; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in seed-planters; and it has for its object to provide a simple and efficient means of controlling the seed-planting mechanism and the plows for covering in the furrows, so that the said seed-planting mechanism and plows may be either separately or simultaneously thrown into or out of operation at the will of the driver.

To this end the invention consists in the combination, with the seed-dropping mechanism and furrow-covering plows, of two compound levers fulcrumed to the frame of the planter and provided with pedals, which may be operated by the feet of the driver to control said planting mechanism and furrow-covering plows, as more fully hereinafter specified.

In the drawings, Figure 1 represents a top view of my improved apparatus; Fig. 2, a rear view thereof; and Fig. 3, a detached view, showing the means of connecting the plow-beams with the operating-levers.

The letter A indicates the truck or frame of the apparatus, mounted upon the wheels B. One of said wheels has rigidly secured to it a gear-wheel, C, which intermeshes with a pinion, D, on a shaft, E, so as to rotate said shaft when the apparatus is in motion. The said shaft has mounted upon it a wheel, F, carrying a series of laterally-projecting cams, G, which are adapted to engage and operate the levers H, fulcrumed at I to the truck or frame A. The said levers H, at their outer ends, are connected to and operate the slides K, which are located and adapted to travel in ways at the bottom of the respective hoppers M. Each of said slides is provided with a pocket, N, which is adapted to receive the seed and deliver the same to the dropping-tubes O, leading to the rear of the plows P.

The slides are provided with springs R, which serve to hold and return the said slides to a normal position.

The letter S indicates two bifurcated beams carrying the furrow-plows P, above mentioned, and the furrow-covering plows T. Said beams are pivoted at their forward ends to the frame A, and at their rear ends are connected, by means of chains A', to the rear ends of the levers B', which are fulcrumed to the cross-beam C' of the frame A, which beam also carries the seat D'.

To the forward ends of the levers B' are secured the levers E', which are connected by links F' to the levers H, respectively.

The lower ends of the levers E' are provided with pedals G', by means of which they can be operated by the foot of the driver.

The dropping-tubes O sit loosely in the tubular extensions I' of the plow-beams, so as to drop the seed immediately behind the furrow-plows into the furrow.

The operation of my invention will be readily understood in connection with the above description.

When it is desired to throw the seed-dropping mechanism and the plows out of operation, it is only necessary to operate the levers by means of the pedals so as to elevate the plows and draw the levers H away from the cams G.

Having thus described my invention, what I claim, and desire to secure by Letters Patent, is—

1. In combination with the driving-wheel B, the shaft E and operating-gearing, the wheel F and its cams, the levers H and the slides K, and the levers B' and E' and connecting-links F', the whole arranged to operate substantially as specified.

2. In combination with the lever G' and connecting-rod F', the levers B' and H, arranged to be operated either separately or together, for elevating the furrowing and sowing plows simultaneously with the disengaging of the seeding devices, substantially as set forth and shown.

In testimony that I claim the foregoing I have hereunto set my hand this 5th day of November, 1879.

ROBERT L. BENEDICT.

Witnesses:
DAVID REANER,
JOHN B. WRAY.